(12) United States Patent
Bisiules

(10) Patent No.: US 10,985,454 B2
(45) Date of Patent: Apr. 20, 2021

(54) BASE STATION ANTENNAS HAVING BOTTOM END CAPS WITH ANGLED CONNECTOR PORTS

(71) Applicant: CommScope Technologies LLC, Hickory, NC (US)

(72) Inventor: Peter J. Bisiules, LaGrange Park, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/612,249

(22) PCT Filed: Feb. 1, 2018

(86) PCT No.: PCT/US2018/016340
§ 371 (c)(1),
(2) Date: Nov. 8, 2019

(87) PCT Pub. No.: WO2018/231283
PCT Pub. Date: Dec. 20, 2018

(65) Prior Publication Data
US 2020/0176861 A1    Jun. 4, 2020

Related U.S. Application Data

(60) Provisional application No. 62/520,068, filed on Jun. 15, 2017.

(51) Int. Cl.
*H01Q 13/00*    (2006.01)
*H01Q 1/42*    (2006.01)
(Continued)

(52) U.S. Cl.
CPC ............ *H01Q 1/42* (2013.01); *H01Q 21/08* (2013.01); *H01Q 21/24* (2013.01); *H01Q 25/00* (2013.01);
(Continued)

(58) Field of Classification Search
CPC .......... H01Q 1/42; H01Q 21/08; H01Q 21/24; H01Q 25/00; H01R 24/52
See application file for complete search history.

(56) References Cited

U.S. PATENT DOCUMENTS

2010/0201591 A1\* 8/2010 Girard ...................... H01O 3/32
343/766
2012/0194405 A1  8/2012 Brink
(Continued)

FOREIGN PATENT DOCUMENTS

EP          0014635 B1    3/1983

OTHER PUBLICATIONS

International Search Report and Written Opinion of the International Searching Authority, International Application No. PCT/US2018/016340, dated Jun. 8, 2018, 11 pp.

*Primary Examiner* — Dieu Hien T Duong
(74) *Attorney, Agent, or Firm* — Myers Bigel, P.A.

(57) ABSTRACT

A base station antenna includes a radome having a bottom opening, an antenna assembly within the radome, a bottom end cap covering the bottom opening of the radome, the bottom end cap including a plurality of connector receptacles, and a plurality of connectors mounted in respective ones of the connector receptacles, each connector including a connector port that extends downwardly from the bottom end cap. Longitudinal axes of a first subset of the connectors extend at respective oblique angles with respect to a plane that is normal to a longitudinal axis of the antenna.

20 Claims, 7 Drawing Sheets

(51) Int. Cl.
*H01Q 21/08* (2006.01)
*H01Q 21/24* (2006.01)
*H01Q 25/00* (2006.01)
*H01R 24/52* (2011.01)
*H01Q 1/24* (2006.01)

(52) U.S. Cl.
CPC ............. *H01R 24/52* (2013.01); *H01Q 1/246* (2013.01); *H01R 2201/02* (2013.01)

(56) References Cited

U.S. PATENT DOCUMENTS

| | | | |
|---|---|---|---|
| 2012/0280874 A1 | 11/2012 | Kim et al. | |
| 2013/0029526 A1* | 1/2013 | Berger | H01R 24/52 439/607.41 |
| 2014/0320371 A1* | 10/2014 | Iso | H01O 21/0081 343/848 |
| 2015/0091767 A1 | 4/2015 | Matitsine et al. | |

* cited by examiner

BASE STATION ANTENNAS HAVING BOTTOM END CAPS WITH ANGLED CONNECTOR PORTS

CROSS-REFERENCE TO RELATED APPLICATIONS

The present application is a 35 U.S.C. § 371 national stage application of PCT Application No. PCT/US2018/016340, filed on Feb. 1, 2018, which itself claims priority to U.S. Provisional Patent Application Ser. No. 62/520,068, filed Jun. 15, 2017, the entire contents of both of which are incorporated herein by reference as if set forth in their entireties. The above-referenced PCT Application was published in the English language as International Publication No. WO 2018/231283 A1 on Dec. 20, 2018.

BACKGROUND

The present invention generally relates to radio communications and, more particularly, to base station antennas for cellular communications systems.

Cellular communications systems are well known in the art. In a cellular communications system, a geographic area is divided into a series of regions that are referred to as "cells" which are served by respective base stations. Each base station may include one or more base station antennas that are configured to provide two-way radio frequency ("RF") communications with fixed and mobile subscribers that are within the cell served by the base station. In many cases, each base station is divided into "sectors." For example, a hexagonally shaped cell may be divided into three 120° sectors, and each sector is served by one or more base station antennas that have an azimuth half-power beamwidth of approximately 65°. Typically, the base station antennas are mounted on a tower or other raised structure, with the radiation patterns ("antenna beams") that are generated by the base station antennas directed outwardly. Base station antennas are often implemented as linear phased arrays of radiating elements.

In order to accommodate increasing volume of cellular communications traffic, cellular operators have added cellular service in a variety of new frequency bands. Different linear arrays of radiating elements are often used to support service in the different frequency bands. As the number of frequency bands has proliferated, and increased sectorization has become more common (e.g., dividing a cell into six, nine or even twelve sectors), the number of base station antennas deployed at a typical base station has increased significantly. However, due to, for example, local zoning ordinances and/or weight and wind loading constraints for the antenna towers, there is often a limit as to the number of base station antennas that can be deployed at a given base station. In order to increase capacity without further increasing the number of base station antennas, multi-band base station antennas are commonly used that have multiple linear arrays of radiating elements in a single antenna. One common multi-band base station antenna design is the RVV antenna, which includes one linear array of "low-band" radiating elements that are used to provide service in the 694-960 MHz frequency band (which is often referred to as the "R-band") and two linear arrays of "high-band" radiating elements that are used to provide service in the 1695-2690 MHz frequency band (which is often referred to as the "V-band"). These linear arrays are mounted in side-by-side fashion. Other multi-band base station antennas include, for example, the RRVV antenna, which has two linear arrays of low-band radiating elements and two linear arrays of high-band radiating elements, and the RR4V antenna, which has two linear arrays of low-band radiating elements and four linear arrays of high-band radiating elements.

Most base station antennas use dual-polarized radiating elements in their linear arrays, so that the same RF signal may be transmitted from each linear array at two orthogonal polarizations. Typically, a linear array of dual polarized radiating elements is connected to an associated radio through two connector ports on a base station antenna, namely a first connector port for the first polarization (e.g., a slant +45° polarization) and a second connector port for the second polarization (e.g., a slant −45° polarization). Additionally, many base station antennas include wideband radiating elements that may be used to transmit and receive signals in multiple frequency sub-bands. For example, a base station antenna may include a linear array of low-band radiating elements that can be used to transmit and receive signals in both the 700 MHz frequency sub-band and the 800 MHz frequency sub-band. Such an antenna may include one or more diplexers that connect the linear array of low-band radiating elements to both a radio operating in the 700 MHz sub-band and a radio operating in the 800 MHz sub-band. Thus, such a linear array may be connected to as many four radio ports through four connector ports on the base station antenna, namely a +45° polarization 700 MHz port, a −45° polarization 700 MHz port, a +45° polarization 800 MHz port, and a −45° polarization 800 MHz port. Thus, an RRVV antenna (four linear arrays) that has dual-polarized wideband radiating elements may have as many as sixteen connector ports. An RR4V antenna (six linear arrays) could potentially require as many as twenty-four connector ports. Additional connector ports may be needed for control signal connections such as connector ports for Antenna Interface Standards Group ("AISG") control channels.

SUMMARY

Pursuant to embodiments of the present invention, base station antennas are provided that include a radome having a bottom opening, an antenna assembly within the radome, and a bottom end cap covering the bottom opening of the radome. The bottom end cap includes a plurality of connector receptacles. A plurality of connectors are mounted in respective ones of the connector receptacles, each connector including a connector port that extends downwardly from the bottom end cap. Longitudinal axes of a first subset of the connectors extend at respective oblique angles with respect to a plane that is normal to a longitudinal axis of the antenna.

Pursuant to further embodiments of the present invention, base station antennas are provided that include a radome having a bottom opening, an antenna assembly within the radome, a bottom end cap covering the bottom opening of the radome, the bottom end cap including a plurality of connector receptacles, and a plurality of connectors mounted in respective ones of the connector receptacles, each connector including a connector port that extends downwardly from the bottom end cap. A longitudinal axis of a first of the connector ports and a vector that extends along a plane defined by the bottom end cap from the first of the connector ports to a closest point along a periphery of the bottom end cap intersect to form an acute angle.

In some embodiments of the above described base station antennas, the plane that is normal to a longitudinal axis of the antenna is defined by a planar section of the bottom end cap, and the longitudinal axis of each connector in the first subset of the connectors ports and a respective vector that extends from each connector in the first subset of the connectors to a respective closest point along a periphery of the bottom end cap intersect to form an acute angle. In some embodiments, each acute angle may be less than 80°. For example, in some embodiments each acute angle may be between 45° and 80°.

In some embodiments, the base station antenna includes at least one rearwardly extending mounting fixture, and the first subset of the connectors includes at least some of the connectors that are adjacent a forward edge and/or a side edge of the bottom end cap.

In some embodiments, the connector port of each connector in the first subset of the connectors is angled outwardly toward a periphery of the bottom end cap.

In some embodiments, each connector in a second subset of the connectors has a respective longitudinal axis that intersects the bottom end cap at an angle of substantially 90°. In some embodiments, at least some of the connectors in the second subset of the connectors are mounted closer to a center of the bottom end cap than are at least some of the connectors in the first subset of the connectors.

In some embodiments, each connector receptacle for the connectors in the first subset of the connectors comprises a panel having an opening extending therethrough, and each panel of the connector receptacles for the connectors in the first subset of the connectors is an angled panel that intersects the plane at an angle of at least 10°. In some embodiments, the longitudinal axes of the first subset of the connectors are substantially perpendicular to respective ones of the panels of the connector receptacles. In some embodiments, each angled panel extends downwardly from the plane defined by a planar section of the bottom end cap. In some embodiments, each angled panel extends upwardly from the plane defined by a planar section of the bottom end cap.

In some embodiments, each connector receptacle for the connectors in the first subset of the connectors may include an inwardly projecting boss.

Pursuant to further embodiments of the present invention, base station antennas are provided that include a radome having a bottom opening, an antenna assembly within the radome, a bottom end cap covering the bottom opening of the radome, the bottom end cap including a downwardly extending protrusion having a plurality of sidewalls, wherein at least some of the sidewalls include connector receptacles, and a plurality of connectors mounted in respective ones of the connector receptacles, each connector including a connector port that extends downwardly from the bottom end cap.

In some embodiments, the bottom end cap further includes a planar section that extends around the periphery of the bottom end cap, the downwardly extending protrusion extending downwardly from the planar section. In some embodiments, a first of the sidewalls intersects a plane defined by the planar section at an oblique angle. In some embodiments, the oblique angle is between 95° and 135°. In some embodiments, at least some of the connector receptacles include respective oval openings. In some embodiments, the downwardly extending protrusion has a bottom surface that is substantially perpendicular to a longitudinal axis of the base station antenna.

DETAILED DESCRIPTION

Figure 1:
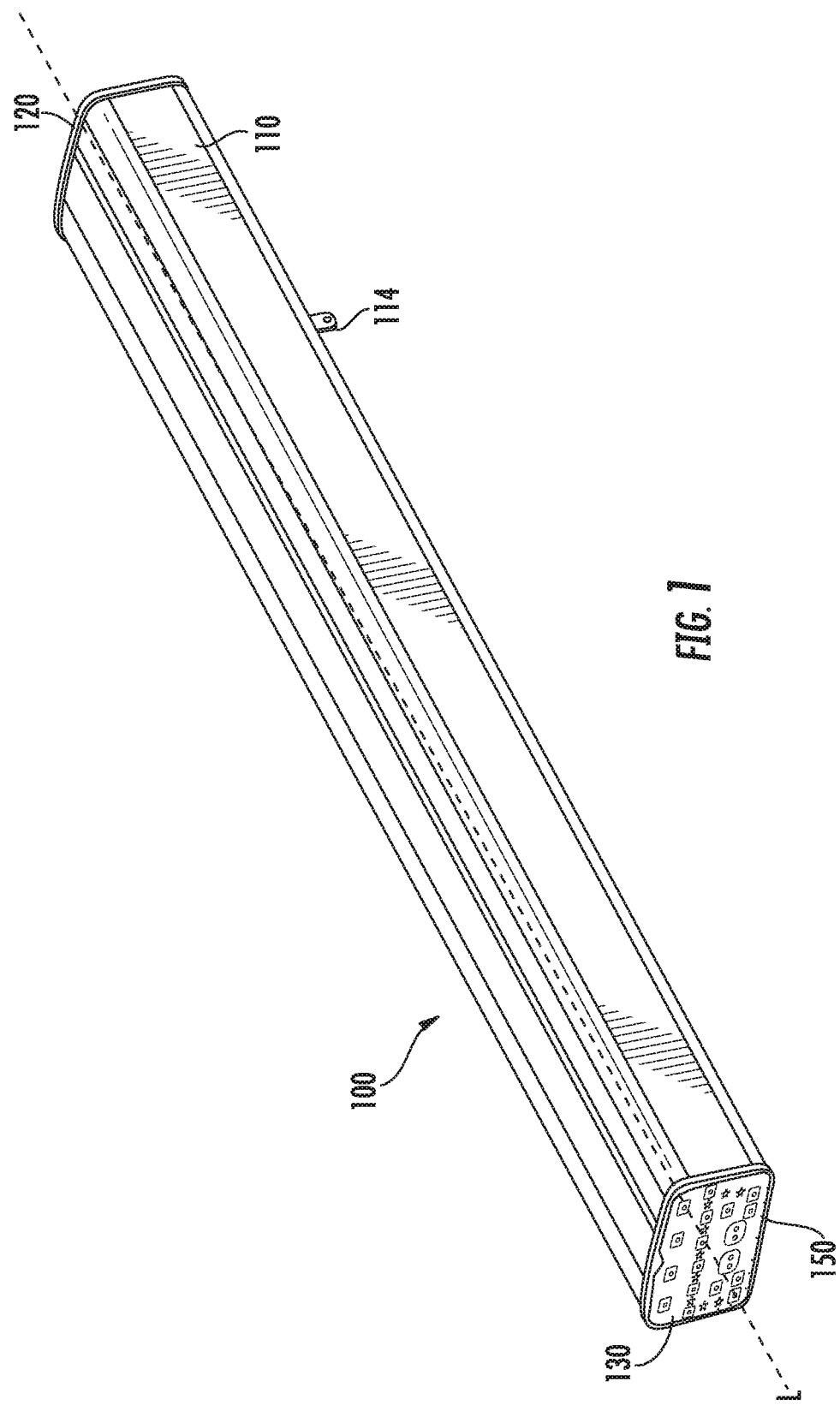
FIG. 1 is a side perspective view of a base station antenna according to embodiments of the present invention.

Base station antennas typically include a bottom end cap that has a plurality of double-sided connectors mounted therethrough. Each double-sided connector may have an internal connector that connects to a respective one of a plurality of "internal" coaxial cables that are routed within the interior of the base station antenna, and an external connector that is typically referred to as a "connector port." Coaxial jumper cables may be connected to the respective connector ports to connect each connector port to a respective port on a radio. Mounting these double-sided connectors so that the connector ports protrude downwardly from the bottom end cap of the base station antenna provides a degree of protection against water or moisture ingress to the antenna through the openings that receive the double-sided connectors.

While base station antennas are being deployed that have increased numbers of linear arrays, the size of the antennas is not increasing proportionally. Instead, cellular network operators are typically only willing to accept a small increase in the width and/or depth of the base station antenna, as large antennas implicate weight, visual blight and/or wind-loading concerns. As a result, base station antennas that have a large number of linear arrays may require a large number of connector ports on a relatively small bottom end cap.

When a base station antenna is installed atop an antenna tower or other mounting structure, a technician may connect a coaxial jumper cable to each connector port on the bottom end cap of the antenna. These coaxial jumper cables may, for example, connect directly to remote radio heads, connect to intervening equipment such as tower-mounted filters that are connected between the antenna and remote radio heads, or connect to a trunk cable termination (in case where the radios are mounted at the base of the antenna tower). It may be important that the technician tightly connect each coaxial jumper cable to its respective connector port and properly waterproof the connection (using, for example, a sealing boot) in order to ensure proper operation of the base station antenna. Improper connections may lead to degraded performance due to, for example, passive intermodulation ("PIM") distortion that may arise if the connector on the coaxial jumper cable is not tightly installed on the connector port or electrical short circuits and/or corrosion due to water ingress at the connector ports.

In order to ensure that technicians have sufficient room to properly connect the coaxial jumper cables to the connector ports on a base station antenna, adjacent connector ports are typically arranged to have at least a minimum specified center-to-center spacing. The most commonly used connector ports are 7/16-DIN connector ports, mini-DIN connector ports and 4.3/10 connector ports. For antennas using 7/16-DIN connector ports, the center of each connector port may be positioned to be spaced at least 51 mm away from the center of any other connector port. For antennas using mini-DIN and 4.3/10 connector ports, the center of each connector port may be positioned to be spaced at least 45 mm away from the center of any other connector port. As the number of connector ports per base station antenna increases more quickly than the size of the bottom end cap, it may become difficult to maintain a desired minimum center-to-center spacing between connector ports. Additionally, as the number of connector ports increases, it may become necessary to mount connector ports near the front edge of the bottom end cap (i.e., the edge that is directly underneath the front surface of the radome. When connectors are located along the front edge of the bottom end cap, the internal coaxial cables that connect thereto may be located immediately adjacent the lowermost radiating elements. If located too closely to the radiating elements, these internal coaxial cables may negatively impact the antenna beams formed by the linear arrays. Thus, it may be necessary to extend the length of the base station antenna to ensure that the internal cables do not exceed maximum bend radii and/or are not routed to close to any of the radiating elements such that the internal coaxial cables negatively impact the radiation patterns of any of the linear arrays.

Pursuant to embodiments of the present invention, base station antennas are provided that have bottom end caps with connector ports that are mounted to extend from the bottom end cap at oblique angles with respect to a plane that is perpendicular to a longitudinal axis of the base station antenna. These base station antennas may include a radome having a bottom opening, an antenna assembly within the radome, a bottom end cap that has a plurality of connector receptacles covering the bottom opening of the radome, and a plurality of connectors mounted in respective ones of the connector receptacles. Each connector may include a connector port that extends downwardly from the bottom end cap to be accessible from outside of the antenna. Longitudinal axes of at least a subset of the connectors extend at respective oblique angles with respect to a plane that is perpendicular to a longitudinal axis of the antenna, such as a plane defined by the bottom end cap. In some embodiments, each oblique angle may be less than 80°. For example, the oblique angle may be between 45° and 75° in some embodiments.

In some embodiments, the subset of the connectors that extend at oblique angles with respect to the plane defined by the bottom end cap may be connectors that are located adjacent a front edge and/or connectors adjacent one or both side edges of the bottom end cap. The connector ports in this subset may be angled "outwardly" such that an angle defined by the longitudinal axis of each connector port in the subset and a respective vector that extends from the connector port to a respective closest point along a periphery of the bottom end cap is an acute angle. Each connector may be mounted in a respective connector receptacle. Each connector receptacle may comprise a panel having an opening extending therethrough. The panel may be angled by at least 10° with respect to the plane defined by the bottom end cap in some embodiments.

Embodiments of the present invention will now be described in further detail with reference to the attached figures.

Figure 2:
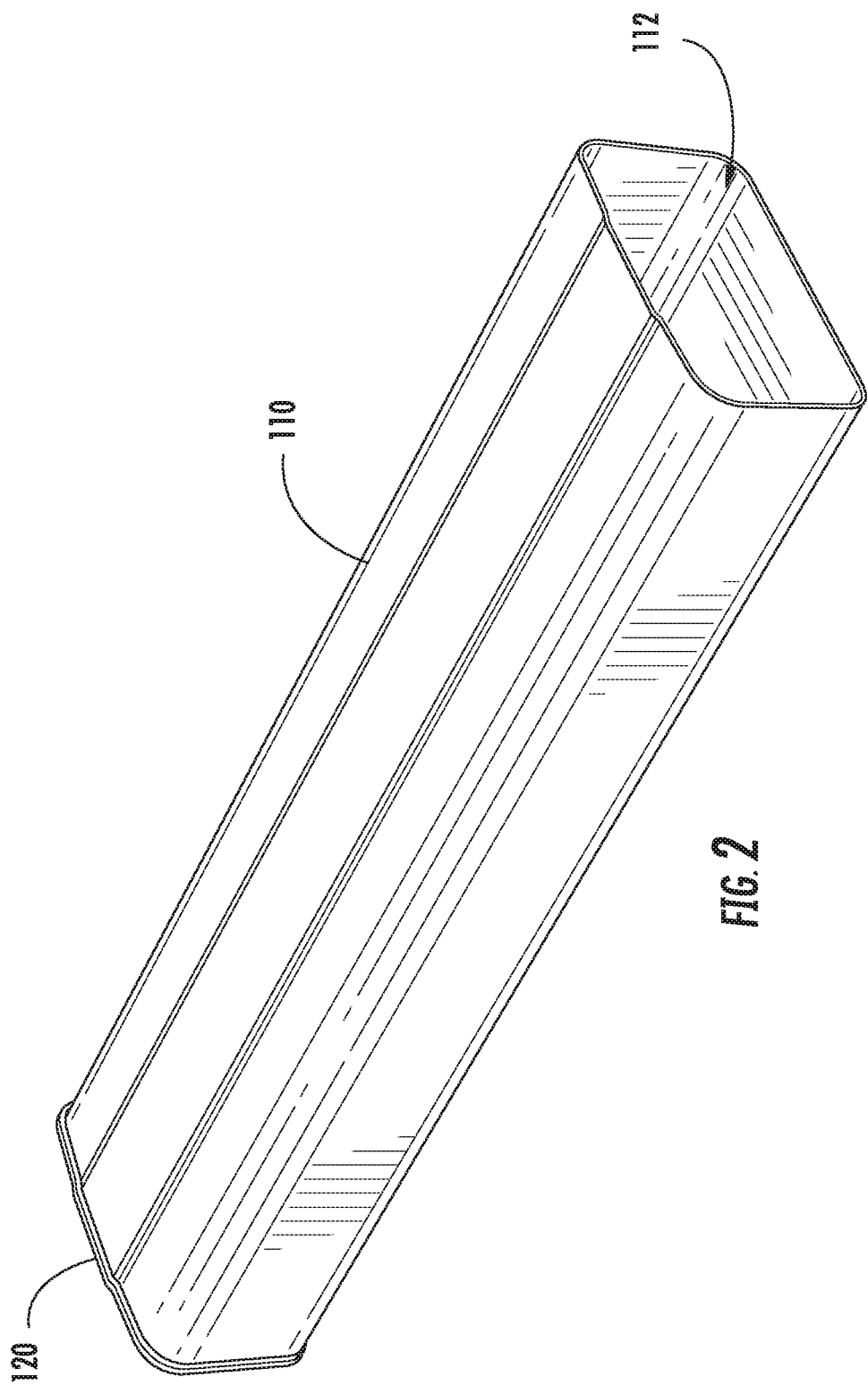
FIG. 2 is a perspective view of the radome of the base station antenna of FIG. 1.
Figure 3:
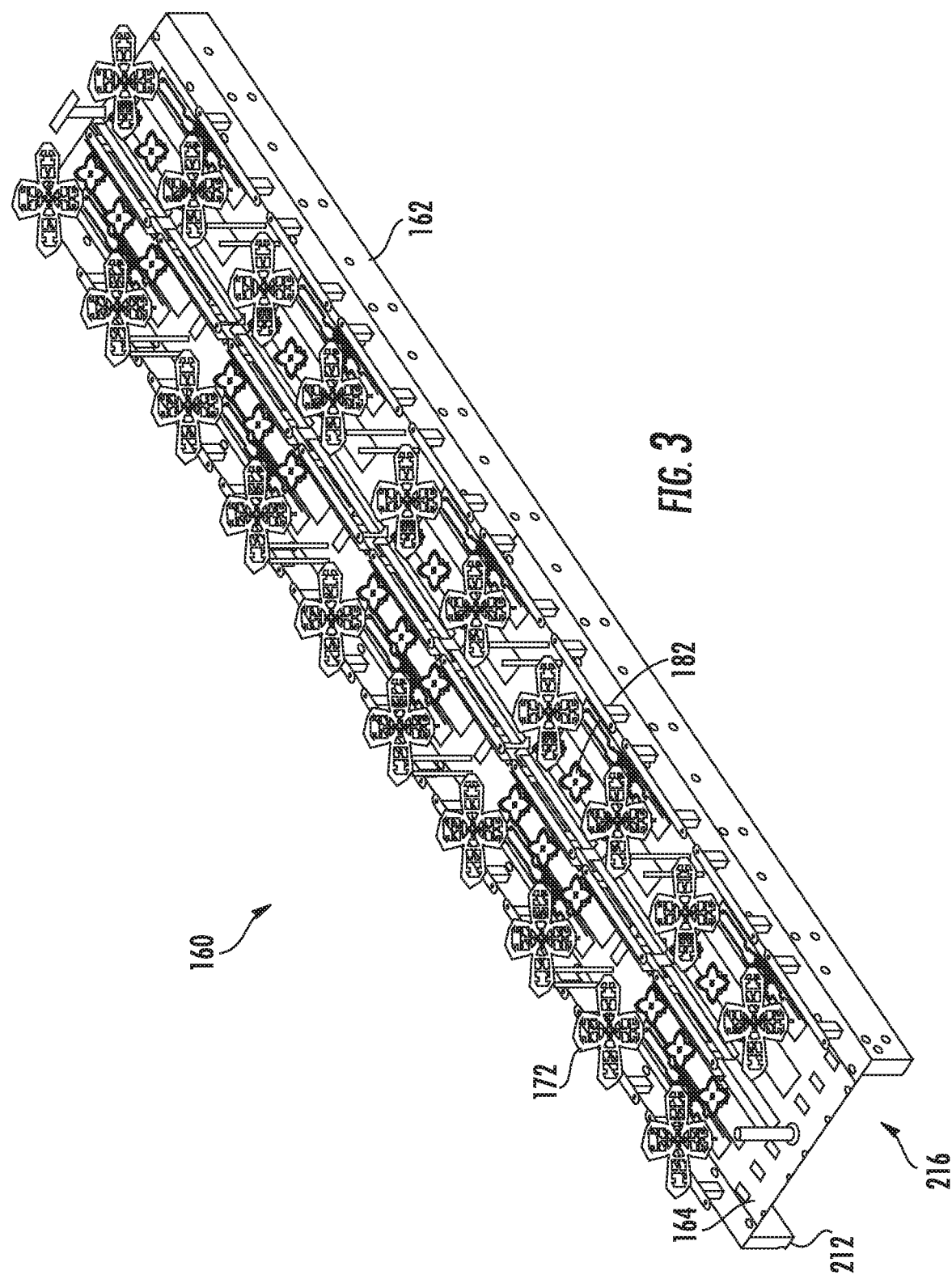
FIG. 3 is a perspective view of a base station antenna of FIG. 1 with the radome removed.
Figure 4:
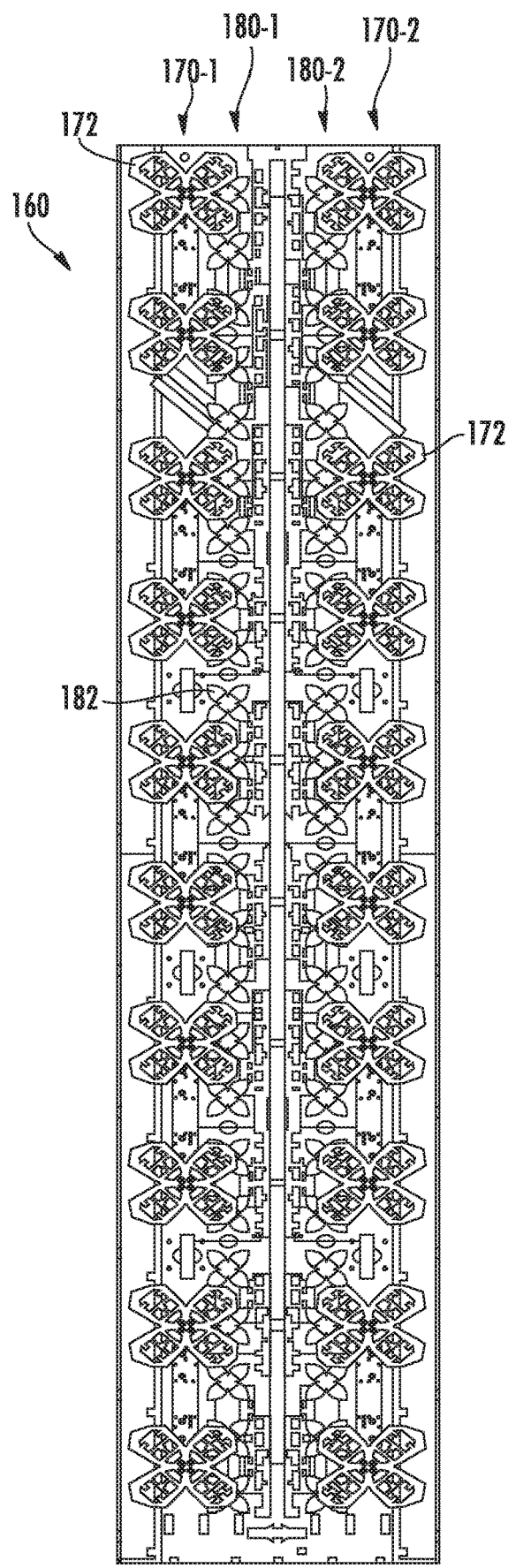
FIG. 4 is a front view of a base station antenna of FIG. 1 with the radome removed.
Figure 5:
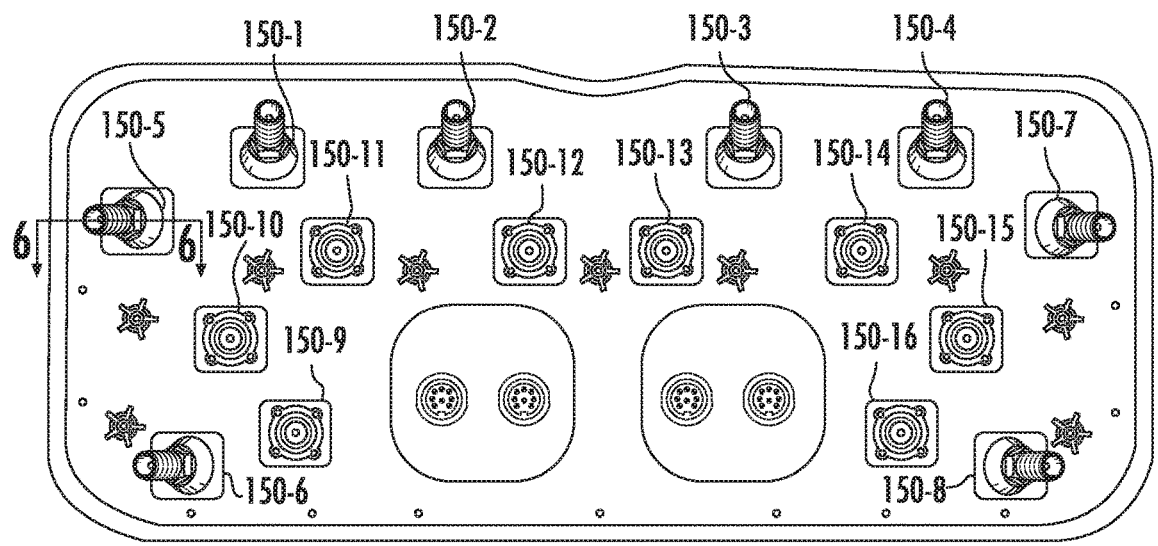
FIG. 5 is a plan view illustrating the exterior surface of the bottom end cap of the base station antenna of FIG. 1 with the connectors installed therein.
Figure 6:
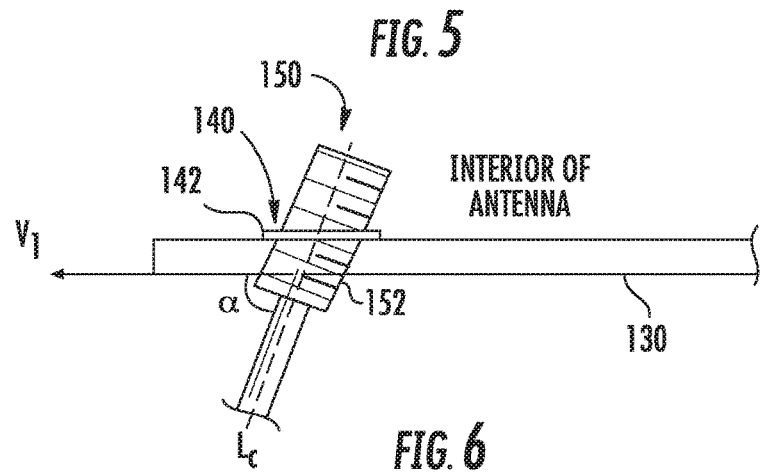
FIG. 6 is a schematic cross-sectional view taken along line 6-6 of FIG. 5.
Figure 7:
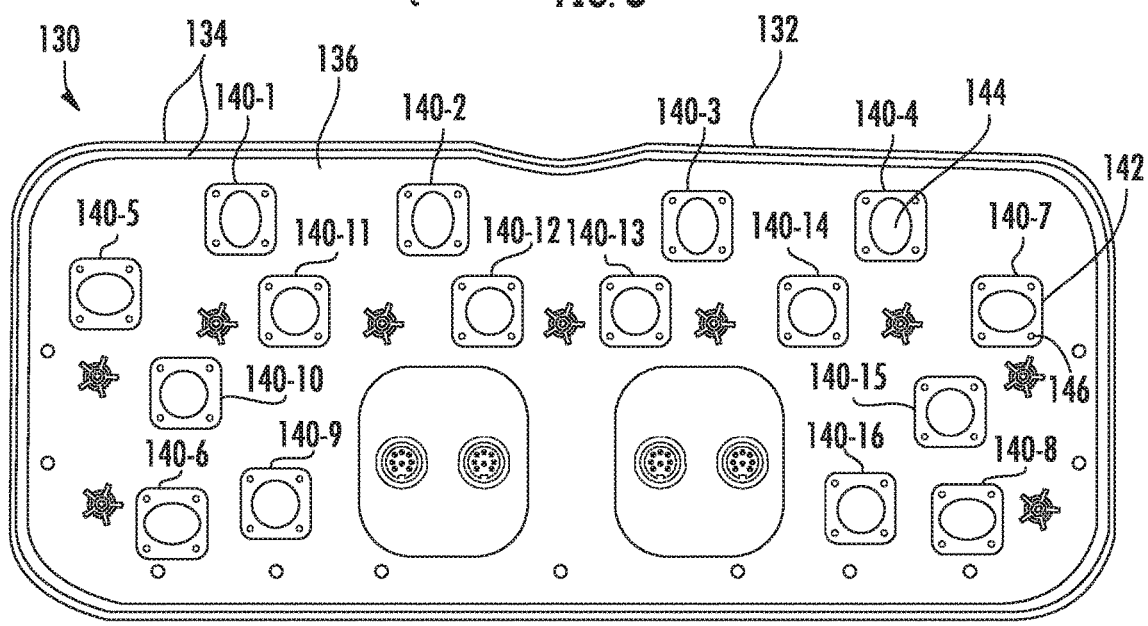
FIG. 7 is a plan view illustrating the interior surface of the bottom end cap of FIG. 5 with the connectors omitted.

FIGS. 1-7 illustrate a base station antenna 100 according to certain embodiments of the present invention. In particular, FIG. 1 is a front perspective view of the antenna 100, and FIG. 2 is a perspective view of the radome of antenna 100. FIGS. 3 and 4 are a perspective view and a front view, respectively, of the antenna 100 with the radome removed to illustrate the inner components of the antenna. FIG. 5 is a plan view illustrating the exterior surface of the bottom end cap of antenna 100 with connectors mounted therein. FIG. 6 is a schematic cross-sectional diagram taken along line 6-6 of FIG. 5. FIG. 7 is a plan view illustrating the interior surface of the bottom end cap prior to installation of the connectors.

As shown in FIGS. 1-7, the base station antenna 100 is an elongated structure that extends along a longitudinal axis L. The base station antenna 100 may have a tubular shape with a generally rectangular cross-section. The antenna 100 includes a radome 110 and a top end cap 120, which may be part of the radome 110 or a separate piece that is attached to the radome 110. As shown in FIG. 2, the radome has a bottom opening 112. Referring again to FIG. 1, a bottom end cap 130 which includes a plurality of connectors 150 mounted therein may be attached to cover the bottom opening 112. One or more mounting brackets 114 are provided on the rear side of the radome 110 which may be used to mount the antenna 100 onto an antenna mount (not shown) on, for example, an antenna tower. The antenna 100 is typically mounted in a vertical configuration so that the longitudinal axis L may be generally perpendicular to a plane defined by the horizon when the antenna 100 is mounted for normal operation.

As shown in FIGS. 3-4, the base station antenna 100 includes an antenna assembly 160. The antenna assembly 160 may be slidably inserted into the radome 110 through the bottom opening 112 thereof (see FIG. 2). The antenna assembly 160 includes a ground plane structure 162 that includes a reflector 164. Various mechanical and electronic components of the base station antenna 100 may be mounted behind the reflector 164 such as, for example, phase shifters, remote electronic tilt units, mechanical linkages, a controller, diplexers, and the like. The reflector 164 may comprise a metallic surface that serves as a reflector and ground plane for the radiating elements of the antenna 100.

A plurality of radiating elements are mounted to extend forwardly from the reflector 164. The radiating elements may include, for example, low-band radiating elements 172 and high-band radiating elements 182. As shown best in FIG. 4, the low-band radiating elements 172 are mounted in two vertical columns to form two vertically-disposed linear arrays 170-1, 170-2 of low-band radiating elements 172. The high-band radiating elements 182 may likewise be mounted in two vertical columns to form two vertically-disposed linear arrays 180-1, 180-2 of high-band radiating elements 182. The linear arrays 180 of high-band radiating elements 182 may be positioned between the linear arrays 170 low-band radiating elements 172. The low-band radiating elements 172 may be configured to transmit and receive signals in, for example, some or all of 694-960 MHz frequency band. The high-band radiating elements 182 may be configured to transmit and receive signals in, for example, some or all of the 1695-2690 MHz frequency band.

Referring to FIG. 5, a plurality of connectors 150-1 through 150-16 are mounted to extend through the bottom end cap 130. The portion of each connector 150 that protrudes downwardly from the bottom end cap 130 (i.e., the portion visible in FIG. 5) is referred to as a connector port 152. In the embodiment of FIG. 5, a total of sixteen connector ports 152 are mounted in the bottom end cap 130. Four connector ports 152 are provided for each linear array 170, 180, namely a connector port for RF signals having a slant +45° polarization in a first sub-band, a connector port for RF signals having a slant −45° polarization in the first sub-band, a connector port for RF signals having a slant +45° polarization in a Second sub-band, and a connector port for RF signals having a slant −45° polarization in the second sub-band. The bottom end cap 130 further includes four connectors 154 that receive cables that carry AISG control signals. A plurality of small holes are also provided through the bottom end cap 130 that receive screws that attach the bottom end cap to the antenna assembly 160.

As can be seen in FIG. 5, the connectors 150 are in close proximity to each other, and this may make it more difficult for technicians to attach coaxial jumper cables to the connector ports 152. Additionally, there is little additional room on the bottom end cap 130 for additional connector ports 152.

As can also be seen in FIG. 5, the four connectors 150-1 through 150-4 that are adjacent a front edge 132 of the bottom end cap 130 (i.e., the edge of the bottom end cap 130 that is underneath the front surface of the radome 110) are angled outwardly toward the front edge 132 of the bottom end cap 130. As a result, the connector ports 152 on these connectors 150-1 through 150-4 may be more easily accessed by a technician who is attaching (or detaching) coaxial jumper cables thereto. Likewise the two connectors 150-5, 150-6 and 150-7, 150-8 that are adjacent each side edge of the bottom end cap 130 are angled outwardly toward the respective side edges of the bottom end cap 130 so that a technician may more readily attach and detach coaxial jumper cables to the connector ports 152 on these connectors 150.

FIG. 6 is a schematic cross-sectional diagram taken along line 6-6 of FIG. 5. As shown in FIG. 5, because each of the connectors 150-1 through 150-8 are angled outwardly, the longitudinal axis $L_C$ (i.e., an axis running lengthwise through the center of the connector 150) of each of these connectors 150 extends at an oblique angle α with respect to the plane that is defined by the bottom surface of the end cap 130. The angle α is defined by the longitudinal axis $L_C$ of one of the angled connectors 150 and a vector $V_1$ that extends from the connector port 152 of the connector 150 to a closest point along a periphery of the bottom end cap 130. As shown in FIG. 6, since the connector ports are angled outwardly towards the periphery of the bottom end cap 130, the angle α is an acute angle. In some embodiments, a may be an angle between 45° and 80°.

Referring now to FIG. 7, the interior surface of the bottom end cap 130 is shown before the connectors 150 are installed therein. As can be seen in FIG. 7, the interior surface of the bottom end cap 130 generally defines a plane. A pair of raised lips 134 that define a channel 136 may be provided around the periphery of the interior of the bottom end cap 130. The channel 136 may receive the lower edge of the radome 110. The bottom end cap 130 further includes a plurality of connector receptacles 140. Each connector receptacle 140 may receive a respective one of the connectors 150. Each connector receptacle 140 may comprise a panel 142 that has an opening 144 extending therethrough. The panels 142 are illustrated in FIG. 7 as having a generally rectangular shape, but panels 142 having other shapes may be used. Each panel 142 may include a plurality of small screw holes 146 that may be used to fixedly attach a connector 150 to the panel 142 using screws. As shown in FIG. 7, the openings 144 for connector receptacles 140-1 through 140-8 are oval to allow for the connectors 150 mounted therein to be installed at an angle, as shown in FIGS. 5-6).

Figure 8:
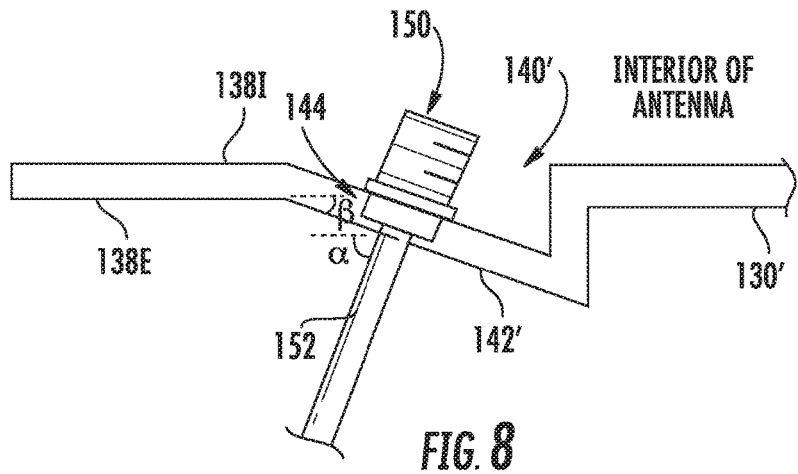
FIG. 8 is a schematic cross-sectional view of a portion of a bottom end cap of a base station antenna according to further embodiments of the present invention that has externally protruding connector mounting receptacles.

FIG. 8 is a schematic cross-sectional diagram of a portion of a bottom end cap 130' according to further embodiments of the present invention. The cross-section of FIG. 8 is taken along the same line (line 6-6 of FIG. 5) as is the cross-section of FIG. 6, but it will be appreciated that the bottom end cap 130' that is shown in FIG. 8 is a slightly modified version of the bottom end cap 130 of FIGS. 5-7. As shown in FIG. 8, the bottom end cap 130' has connector receptacles 140' that include panels 142' that have a different design to facilitate angling of a subset of the connectors 150. It will be appreciated that the bottom end cap 130' of FIG. 8 may be identical to the bottom end cap 130 of FIGS. 5-7 except that connector receptacles 140-1 through 140-8 of bottom end cap 130 of FIGS. 5-7 may be replaced with connector receptacles 140' of FIG. 8 (rotated appropriately to mount the connectors 150 installed therein to be angled in a desired direction).

As can be seen in FIG. 8, the panel 142' of connector receptacle 140' is angled so that the connector port 152 of a connector 150 mounted therein will be angled outwardly toward the periphery of the bottom end cap 130'. As shown in FIG. 8, the bottom end cap 130' is a generally planar structure having an interior surface 138I and an exterior surface 138E. However, at the locations of selected ones of the connector receptacles 140' (in this embodiment connector receptacles 140-1' through 140-8', only one of which is shown in FIG. 8), the panel 142' is formed at an angle with respect to the plane defined by the interior surface 138I of the bottom end cap 130'. The panel 142' may be angled with respect to plane defined by the exterior surface 138E of the bottom end cap 130 by an angle of β=90−α. The connector 150 may be inserted through the opening 144 in panel 142' at a 90° angle. As a result, the connector 150 will intersect the plane defined by the exterior surface 138E of the bottom end cap 130 at the angle α. As can also be seen in FIG. 8, the connector port 152 may be angled so that it extends toward an adjacent edge of the bottom end cap 130' (i.e., away from the center of the bottom end cap 130'), thereby generating additional distance between the connector port 152 and adjacent connector ports 152 (see FIG. 5). The panels 142' for connectors 150-1 through 150-4 may be angled in a first direction (namely sloping upwardly into the interior of the antenna with increasing proximity to the front edge of the bottom end cap 130') while the panels 142' for connectors 150-5 and 150-6 may be angled in a second direction (namely sloping upwardly with increasing proximity to a first side edge of the bottom end cap 130') and the panels 142' for connectors 150-7 and 150-8 may be angled in a third direction (namely sloping upwardly with increasing proximity to a second side edge of the bottom end cap 130')

Figure 9:
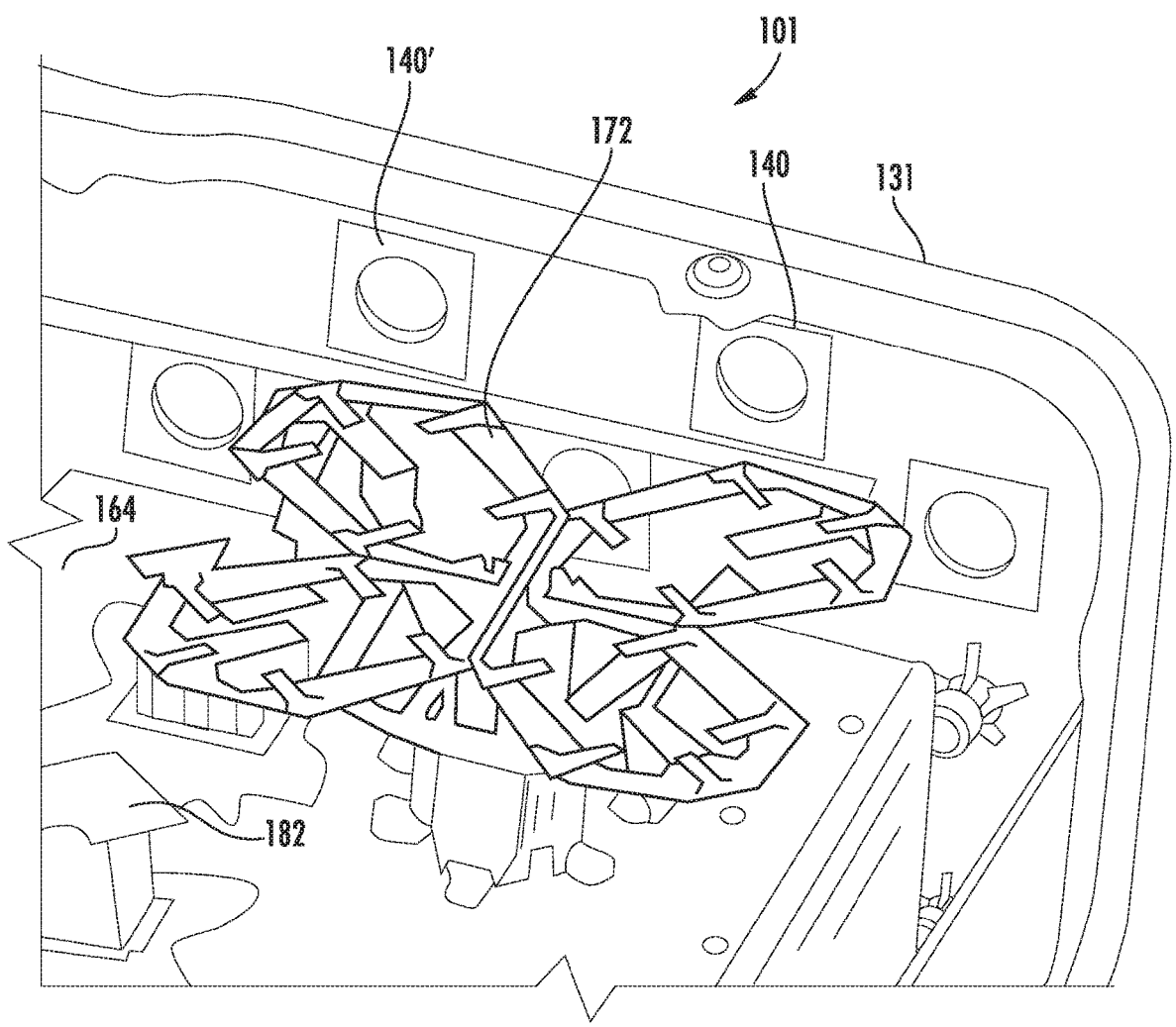
FIG. 9 is a partial perspective view of a bottom portion of a base station antenna similar to the base station antenna of FIG. 1 that uses connectors that are installed in the bottom end cap at 90° angles.

FIG. 9 is an enlarged partial perspective view of a bottom portion of a base station antenna 101 (with the radome thereof removed) that is similar to the base station antenna 100 described above with reference to FIGS. 1-7, except that the bottom end cap 131 of antenna 101 has a conventional design where all of the connectors intersect the plane defined by the bottom end cap 131 at an angle of about 90°. FIG. 9 illustrates the relative locations of the bottom end cap 131, the reflector 164 and the lowermost of the radiating elements 172, 182. As can be seen in FIG. 9, once connectors (not shown) are installed in the connector receptacles 140 that are adjacent the front edge of the antenna 101, the internal coaxial cables (not shown) that are attached to those connectors will be in very close proximity to the lowermost radiating elements 172, 182. Moreover, the internal coaxial cables may have a limited bend radius, so that these cables cannot be bent at sharp angles to keep them clear of the radiating elements 172, 182. As a result, the cables may end up being close enough to the radiating elements 172, 182 such that they may negatively impact the radiation patterns thereof. While this issue can be resolved by extending the length of the antenna 101 so that the bottom end cap 131 may be mounted further away from the antenna assembly, operators desire smaller antennas which is inconsistent with such a design change, and extending the length of the antenna also has negative consequences in terms of weight and cost.

If the bottom end cap 131 of the antenna 101 of FIG. 9 is modified to use one of the bottom end cap 130 or the bottom end cap 130' according to embodiments of the present invention, then the portion of each connector 150 that is mounted adjacent the forward or side edges of the bottom end cap 130 will be angled inwardly toward the center of a transverse cross-section through the antenna 101. As a result, these connectors 150 and the internal coaxial cables attached thereto are angled away from the radiating elements 172, 182. Moreover, as the internal coaxial cables typically are routed through the back center of the antenna 101, the internal coaxial cables are naturally pointed in the correct direction when installed on the connectors 150, reducing the amount of bend required in these cables. Thus, the use of angled connector ports according to the teachings of the present invention may not only make it easier for technicians to properly attach and detach coaxial jumper cables to the external connector ports, but may also avoid interference that internal cables may otherwise cause on the antenna patterns and advantageously reduce the amount of bend in ones of the internal cables that typically require the largest bends.

While FIGS. 1-7 and FIG. 8 illustrate two example antennas according to embodiments of the present invention, it will be appreciated that the angled connector ports disclosed herein may be used on any base station antenna having any number of linear arrays and any number of connector ports. It will also be appreciated that a variety of different techniques may be used to angle the connector ports.

Figure 10:
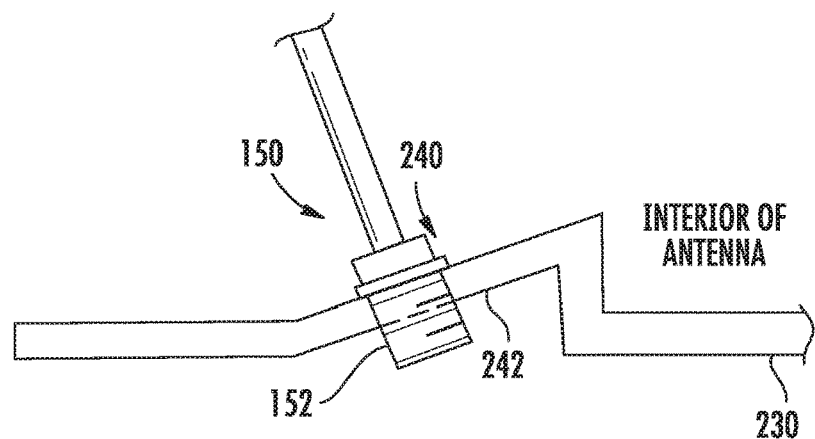
FIG. 10 is a schematic cross-sectional view of an internally protruding mounting receptacle for a bottom end cap according to embodiments of the present invention.

For example, FIG. 10 is a schematic cross-sectional view of a portion of bottom end cap 230 according to further embodiments of the present invention. The bottom end cap 230 may be very similar to the bottom end cap 130' described above, except that the bottom end cap 230 may have connector receptacles 240 with panels 242 that protrude internally into the antenna as opposed to the connector receptacles 140' of bottom end cap 130' that protrude externally. Connectors 150 are received in the respective connector receptacles 240.

Figure 11:
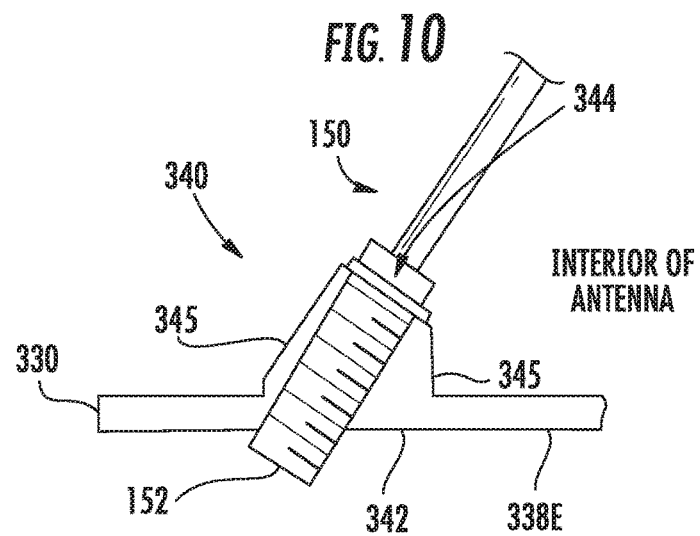
FIG. 11 is an enlarged schematic cross-sectional view of an internally protruding mounting receptacle for a bottom end cap according to further embodiments of the present invention.

As another example, FIG. 11 is a schematic cross-sectional view of a portion of bottom end cap 330 according to further embodiments of the present invention that has a connector receptacle 340 having a panel 342 that may be coplanar with the exterior surface 338E of the bottom end cap 330. The connector receptacle 340 further includes an internally protruding angled boss 345 that has an opening 344 that is sized to receive a connector 150. The connector receptacle 340 may be designed to mount the connector 150 at an oblique angle with respect to the plane defined by the exterior surface 338E of the bottom end cap 330. The boss 345 may protrude externally in other embodiments or portions of the boss 345 may protrude both internally and externally.

Figure 12:
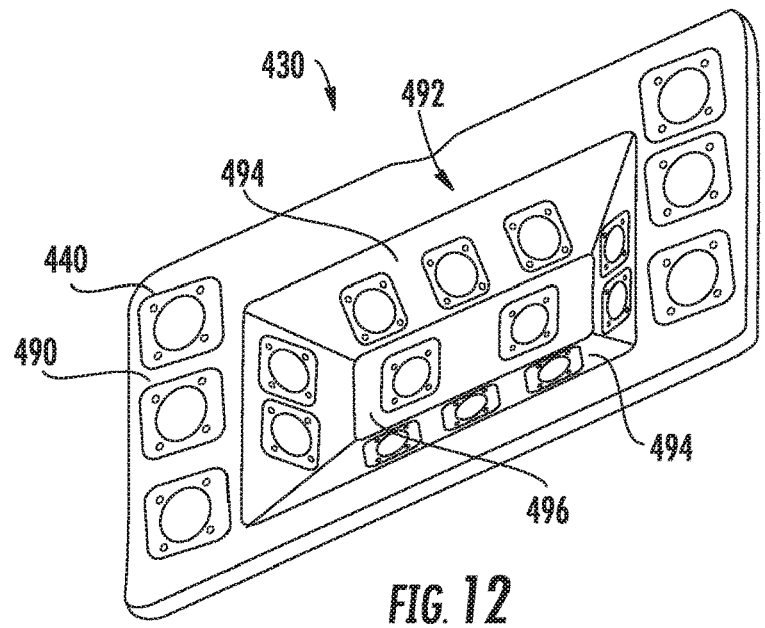
FIG. 12 is a perspective view of a bottom end cap according to further embodiments of the present invention that includes downwardly protruding walls that have a plurality of connectors mounted therein.

FIG. 12 is a perspective view of a bottom end cap 430 according to further embodiments of the present invention that includes downwardly protruding walls that have a plurality of connectors (not shown) mounted therein.

As shown in FIG. 12, another technique for providing room for additional connector ports on the bottom end cap of a base station antenna is to include a downwardly extending protrusion that connectors may be mounted through. For example, FIG. 12 depicts a bottom end cap 430 for a base station antenna that includes a planar section 490 that extends around the periphery of the bottom end cap 430 and a downwardly extending protrusion 492. The downwardly extending protrusion 492 may have a plurality of sidewalls 494 and may have a bottom 496. As shown in FIG. 12, connector receptacles 440 may be formed in the planar section 490, in the sidewalls 494 and/or in the bottom 496. At least some of the sidewalls 494 may intersect a plane that is perpendicular to the longitudinal axis L of an antenna on which the bottom end cap 430 is mounted (e.g., base station antenna 100 described above, with bottom end cap 430 replacing bottom end cap 130) at an oblique angle. For example, each sidewall 494 may meet the planar section 490 of the bottom end cap 430 at an angle of, for example, between 95° and 135° in some embodiments.

As can be seen, the addition of the downwardly extending protrusion 492 increases the external surface area on the bottom end cap 430 that is available for connector receptacles 440. Additionally, since the sidewalls 494 of the downwardly extending protrusion 492 are angled, the connector ports may be pointed in different directions, providing more room around each connector port for a technician attaching (or detaching) coaxial jumper cables thereto. Additionally, by providing the planar section 490 around the periphery of the bottom end cap 430, water that flows down the radome of the antenna is less likely to flow onto the sidewalls 494 of the downwardly extending protrusion 492, reducing the possibility of water ingress through one of the connector ports on the downwardly extending protrusion 492.

It will be appreciated that bottom end cap 430 illustrates one example of a bottom end cap having a downwardly extending protrusion 492, and that a wide variety of other designs may be used.

Note that herein the base station antennas according to embodiments of the present invention and the components thereof have been described using terms that assume that the antennas are mounted for use on a tower with the longitudinal axis of each antenna extending along a respective vertical axis and the front surface of the antenna mounted opposite the tower pointing toward the coverage area for the antenna.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A base station antenna that extends along a longitudinal axis, comprising:
   a radome having a bottom opening;
   an antenna assembly within the radome;
   a bottom end cap covering the bottom opening of the radome, the bottom end cap including a plurality of connector receptacles; and
   a plurality of connectors mounted in respective ones of the connector receptacles, each connector including a connector port that extends downwardly from the bottom end cap,
   wherein longitudinal axes of a first subset of the connectors extend at respective oblique angles with respect to a plane that is normal to the longitudinal axis of the antenna.

2. The base station antenna of claim 1, wherein the plane is defined by a planar section of the bottom end cap, and the longitudinal axis of each connector in the first subset of the connectors ports and a respective vector that extends from each connector in the first subset of the connectors to a respective closest point along a periphery of the bottom end cap intersect to form an acute angle.

3. The base station antenna of claim 2, wherein each acute angle is between 45° and 80°.

4. The base station antenna of claim 2, the base station antenna further comprising at least one rearwardly extending mounting fixture, wherein the first subset of the connectors includes at least some of the connectors that are adjacent a forward edge of the bottom end cap.

5. The base station antenna of claim 2, wherein each connector receptacle for the connectors in the first subset of the connectors comprises a panel having an opening extending therethrough, and each panel of the connector receptacles for the connectors in the first subset of the connectors is an angled panel that intersects the plane at an angle of at least 10°.

6. The base station antenna of claim 1, wherein the connector port of each connector in the first subset of the connectors is angled outwardly toward a periphery of the bottom end cap.

7. The base station antenna of claim 6, wherein each connector in a second subset of the connectors has a respective longitudinal axis that intersects the bottom end cap at an angle of substantially 90°.

8. The base station antenna of claim 7, wherein at least some of the connectors in the second subset of the connectors are mounted closer to a center of the bottom end cap than are at least some of the connectors in the first subset of the connectors.

9. The base station antenna of claim 1, wherein at least some of the connector receptacles include respective oval openings.

10. The base station antenna of claim 1, wherein each connector receptacle for the connectors in the first subset of the connectors comprises an inwardly projecting boss.

11. A base station antenna that extends along a longitudinal axis, comprising:
    a radome having a bottom opening;
    an antenna assembly within the radome;
    a bottom end cap covering the bottom opening of the radome, the bottom end cap including a plurality of connector receptacles; and
    a plurality of connectors mounted in respective ones of the connector receptacles, each connector including a connector port that extends downwardly from the bottom end cap,
    wherein a longitudinal axis of a first of the connector ports and a vector that extends along a plane defined by the bottom end cap from the first of the connector ports to a closest point along a periphery of the bottom end cap intersect to form an acute angle.

12. The base station antenna of claim 11, wherein each acute angle is between 45° and 80°.

13. The base station antenna of claim 12, the base station antenna further comprising at least one rearwardly extending mounting fixture, wherein the first of the connector ports is located adjacent a forward edge or a side edge of the bottom end cap.

14. The base station antenna of claim 12, wherein a second of the connector ports has a longitudinal axis that intersects the plane defined by the bottom end cap at an angle of substantially 90°.

15. The base station antenna of claim 11, wherein at least some of the connector receptacles include respective oval openings.

16. A base station antenna, comprising:
a radome having a bottom opening;
an antenna assembly within the radome;
a bottom end cap covering the bottom opening of the radome, the bottom end cap including a downwardly extending protrusion having a plurality of sidewalls, wherein at least some of the sidewalls include connector receptacles; and
a plurality of connectors mounted in respective ones of the connector receptacles, each connector including a connector port that extends downwardly from the bottom end cap.

17. The base station antenna of claim 16, wherein the bottom end cap further includes a planar section that extends around the periphery of the bottom end cap, the downwardly extending protrusion extending downwardly from the planar section.

18. The base station antenna of claim 16, wherein a first of the sidewalls intersects a plane defined by the planar section at an oblique angle.

19. The base station antenna of claim 16, wherein at least some of the connector receptacles include respective oval openings.

20. The base station antenna of claim 16, wherein the downwardly extending protrusion has a bottom surface that is substantially perpendicular to a longitudinal axis of the base station antenna.

* * * * *